United States Patent
Zbinden et al.

[15] 3,668,228
[45] June 6, 1972

[54] SOLUTIONS OF CURING CATALYSTS FOR POLYSILOXANES

[72] Inventors: Hans Rudolf Zbinden, Allschwil; Armin Hiestand, Binningen, both of Switzerland

[73] Assignee: Ciba Limited, Basel, Switzerland

[22] Filed: June 4, 1969

[21] Appl. No.: 830,495

[30] Foreign Application Priority Data

June 13, 1968 Switzerland ..........................8828/68

[52] U.S. Cl. ................252/431 C, 117/139.5 A, 117/143 A, 117/155 R, 117/161 ZA, 252/182, 260/18 SI, 260/29.2 M
[51] Int. Cl. .......................................................B01j 11/82
[58] Field of Search ................................252/431–436, 426; 260/29.2 M, 18; 117/143 A, 155 R, 161 ZA

[56] References Cited

UNITED STATES PATENTS

| | | | |
|---|---|---|---|
| 2,758,946 | 8/1956 | Spalding et al. | 117/155 XR |
| 2,985,545 | 5/1961 | Leavitt | 260/29.2 |
| 3,061,567 | 10/1962 | Keil | 117/155 X |
| 3,076,773 | 2/1963 | Foster et al. | 260/29.2 |
| 3,098,833 | 7/1963 | Solomon | 260/29.2 X |
| 3,230,289 | 1/1966 | Eder et al. | 117/155 X |
| 3,305,502 | 2/1967 | Lampe | 260/29.2 X |
| 3,320,197 | 5/1967 | Enders et al. | 260/29.2 |
| 3,458,333 | 7/1969 | Schnurrbusch et al. | 260/29.2 X |
| 3,567,499 | 3/1971 | Klebert et al. | 260/29.2 M |

FOREIGN PATENTS OR APPLICATIONS

| | | | |
|---|---|---|---|
| 223,137 | 8/1958 | Australia | 117/161 |
| 227,195 | 10/1958 | Australia | 117/161 |

*Primary Examiner*—Daniel E. Wyman
*Assistant Examiner*—P. E. Konopka
*Attorney*—Harry Goldsmith, Joseph G. Kolodny and Mario A. Monaco

[57] ABSTRACT

Solutions of curing catalysts for polysiloxanes containing a zinc, cadmium, titanium or zirconium salt, an alkylbenzenesulfonic acid salt, a polyethylene glycol compound and an organic solvent are used together with aqueous emulsions of organopolysiloxanes for finishing fiber materials such as paper or textiles.

8 Claims, No Drawings

SOLUTIONS OF CURING CATALYSTS FOR POLYSILOXANES

It is known to finish textile materials, especially cotton fabrics, with the aid of aqueous preparations which contain a) polysiloxanes, b) curing catalysts and optionally c) aminoplasts. These aqueous preparations are dispersions, since the polysiloxanes (silicone oils) and many of the metal salts used as curing catalysts, especially the frequently used zinc octoate, are not soluble in water. It is however important that the undissolved substances present in the aqueous preparations should be finely and uniformly distributed and that this state should be achievable in as simple and reliable a manner as possible. This problem is solved in an advantageous manner by the present invention through the manufacture of stable and clear solutions of the curing catalysts.

The subject of the invention are, accordingly, solutions of curing catalysts for polysiloxanes, characterized in that they contain a) a zinc, cadmium, titanium or zirconium salt of a carboxylic acid which is sparingly soluble in water, b) an alkylbenzenesulphonic acid salt of a metal of the first main group, the second main group, the second sub-group, the third main group, the fourth main group or the fourth sub-group of the periodic system, with the atomic weight of the metal being at most 138 and with the alkyl residue or residues in total containing at least eight carbon atoms, c) a water-soluble polyethylene glycol compound which per molecule contains 18 to 80 —$CH_2CH_2$—O— groups and at least one hydrophobic residue of an organic compound which has been produced by splitting off a reactive hydrogen atom, in d) an optionally halogenated aromatic hydrocarbon having a molecular weight of at most 134 which is liquid at room temperature. The periodic table referred to is that of Lothar Meyer and Mendelejeff.

Appropriately, the solutions contain 13 to 67 percent of component $a$, 1 to 15 percent of component $b$ and $c$ together and 18 to 84 percent of component $d$ relative to the weight of the solution, with the weight ratio of $b:c$ being being 2:1 to 2:3, preferably 1:1.

Components $a$ are preferably zinc or zirconium salts. They may be salts of the most diverse carboxylic acids which are sparingly soluble in water, that is to say soluble to the extent of at most 4 percent. Possible salts are for example salts of alkylarylcarboxylic acids, of aralkylcarboxylic or aryloxyalkylcarboxylic acids, of higher molecular alkylenedicarboxylic acids, but especially of higher molecular saturated or unsaturated fatty acids, that is to say fatty acids containing at least six and up to 22 carbon atoms, and furthermore also salts of appropriate alkylcarboxylic acids having branched alkyl residues. Advantageously, zinc or zirconium salts of carboxylic acids which are still liquid at 20° C. are used. As examples of acids of which the zirconium salts or especially the zinc salts can be used in the present process, the following may be mentioned: caproic acid, oenanthic acid, caprylic acid, polargonic acid, lauric acid, myristic acid, palmitic acid, stearic acid, behenic acid, 2-ethylhexane-acid, oleic acid, undecylenic acid, linoleic acid, linolenic acid, adipic acid, suberic acid, sebacic acid, 4-tert.butylbenzoic acid, phenylacetic acid and phenoxyacetic acid.

The zinc salt of 2-ethylhexane-acid, commonly called zinc octoate for brevity, has proved particularly suitable.

In addition to a zinc, cadmium, titanium and/or zorconium salt of the nature indicated, it is possible to use a tin salt of a carboxylic acid which can be derived from one of the above-mentioned acids or also from others, for example dilauryl tin diacetate, dilauryl tin oxide or dibutyl tin diacetate.

The alkylbenzenesulphonic acid salt (= component $b$) may contain one or more alkyl residues but the total number of the alkyl carbon atoms should always be not less than eight. Compounds which contain a single alkyl residue with eight to 18, especially 11 to 13 and preferably 12, carbon atoms are preferred as component $b$. On the other hand it is also possible to use alkylbenzenesulphonates which contain two or even three alkyl residues such as for example 2 butyl residues or 3 propyl residues. Alkylbenzenesulphonic acid salts of a metal of the second main group, second sub-group, third main group, or fourth main group or fourth sub-group of the periodic system are preferentially employed as component $b$.

Salts of metals of the second main group of the periodic system having an atomic weight of at most 138 are particularly suitable, that is to say barium, strontium, magnesium and preferably calcium.

Apart from these preferred metals, metals of the second sub-group, for example zinc and cadmium, of the third main group, for example aluminum, of the fourth main group, for example tin, or of the fourth sub-group, for example titanium and zirconium, are however also possible. Furthermore salts of metals of the first main group such as for example lithium, sodium or potassium, are also particularly suitable.

The calcium salt of a dodecylbenzene sulphonic acid has proved a preferred component $b$.

Components $c$ are as a rule reaction products of ethylene oxide with organic compounds which possess at least one reactive hydrogen atom and a hydrophobic residue. However, reaction products of appropriate polyethylene glycol compounds with organic compounds of the nature indicated are also possible.

Component $c$ advantageously contains, as a hydrophobic residue, at least one residue which has been produced by splitting off a hydrogen atom from a hydroxyl, mercapto, carboxyl, carboxyamido or amino group of an organic compound. The organic compound having the reactive hydrogen atom and the hydrophobic residue thus for example represents an alcohol, thioalcohol, a phenol, thiophenol, a carboxylic acid, a carboxylic acid amide or an amine. Alkylphenols, especially a tributylphenol, are particularly suitable. It is however also possible to use other organic compounds of the nature indicated, for example nonylphenol, alkylthiophenols, stearyl alcohol, oleyl alcohol, stearic acid, stearic acid hydroxyethylamide, octadecenylamine, octadecylamine, arachylamine or behenylamine.

A particularly valuable component $c$ is characterized in that it represents a water-soluble polyethylene glycol compound which per molecule contains 30 to 50 —$CH_2CH_2$—O— groups and at least one phenoxy residue which is optionally substituted by alkyl groups. Amongst these compounds a water-soluble polyethylene glycol compound which contains 30 —$CH_2CH_2$—O— groups and a tributylphenoxy residue per molecule has proved particularly advantageous.

In order to manufacture the solutions according to the invention, solvents liquid at room temperature, that is at 15° to 25° C. are required as component $d$. Here liquid aromatic hydrocarbons of the benzene series, such as benzene or alkylbenzenes with one to four alkyl carbon atoms, such as for example toluene, xylene or 1,2,3,4-tetrahydronaphthalene, are preferably used.

The solutions can be manufactured in a simple manner by mixing components $a$, $b$, $c$ and $d$ with one another with good stirring. Clear solutions are thereby produced which can be kept very well in closed vessels for a prolonged period.

In order to manufacture aqueous preparations which serve for the finishing of textiles, the curing catalyst solutions are combined with aqueous emulsions of organopolysiloxanes. The curing catalyst solution hereupon becomes emulsified to give an extremely fine emulsion, for example an emulsion in which 50 percent of the particles have a diameter of less than 1.2 $\mu$, 96 percent less than 4 $\mu$ and only 1.6 percent above 8 82.

Such a fine emulsion is important for ensuring uniform distribution of the catalyst on the substrate to be treated. For this reason no patches are formed. $\mu$ The aqueous polysiloxane emulsions can contain the known liquid organopolysiloxanes, for example those with

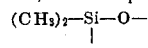

groups, those with

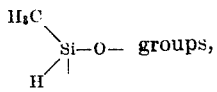 groups, mixtures of both and those containing both groups in the same molecule. Possibilities are above all the methyl-hydrogen-polysiloxanes just mentioned, preferably those which are end-blocked by methyl groups and of which the viscosity at 25° C. is 10 to 700 centipoise. The polysiloxanes can be emulsified in water with the aid of known emulsifiers such as polyvinyl alcohol or ethylene oxide reaction products of higher fatty acids, fatty alcohols, fatty acid amines or fatty acid esters, and can appropriately be stored in the form of stable concentrated stock emulsions and be diluted before use to the use concentration.

The aqueous preparations which contain an aqueous emulsion of a liquid organopolysiloxane and a solution of a curing catalyst of the nature indicated above all serve for the finishing of fiber materials, such as paper or textiles, for example those of regenerated cellulose such as filament rayon or rayon staple, of native cellulose such as cotton, of wool and of synthetic fibers. Preferably, fiber mixtures of wool, of cellulose fibers, such as cotton or viscose filament rayon or rayon staple, with synthetic fibers, such as polyesters, polyamide or polyacrylonitrile, but especially cotton-polyester mixed woven fabrics or mixed spun fibers are finished therewith.

The preparations can be applied in the usual manner which is in itself known to the textile material which is appropriately in the form of piece goods such as woven fabrics, knitted fabrics or felt, for example by spraying, spreading or dipping. It is advantageous to use a padder of the usual construction in such a way that the polysiloxane uptake is adjusted by pressing-out to remain constant at the specified value of 0.2 to 5 percent. It is advisable to follow this by a predrying under conditions which do not as yet effect any significant curing. The drying temperatures can for example be between 50° and 140° C.; at the lower temperature limit practically no curing as yet takes place even at the long drying times here required, and the same is true at the upper limits since here short drying times of the order of magnitude of seconds suffice. Finally, the actual heat treatment takes place with a large amount of air being supplied, appropriately at 90° to 180° C for 20 to 1 minute. If desired, the aqueous preparations can contain yet further additives, for example aminoplast pre-condensates such as a methylol compound of melamine which is optionally etherified by methyl groups, unsubstituted or substituted compounds of ethyleneurea or of propyleneurea, of glyoxal-monourein or of urea, or a product of this nature modified by higher alkyl groups. These aminoplast pre-condensate additives can for example serve for simultaneous crease-proofing.

The amounts of the individual components in the aqueous preparation can fluctuate within wide limits. For example, the amount of polysiloxane is 0.2 to 5 percent relative to the textile material to be finished. 1 to 25 percent of the zinc, cadmium, titanium or zirconium salts are appropriately employed relative to the amount of polysiloxane.

Fabrics which are impregnated with aqueous preparations which contain an emulsion of an organopolysiloxane and a solution of a curing catalyst of the nature indicated, are distinguished by a low re-wettability. These aqueous preparations additionally have the advantage that they do not form any foam on padding. Excellent water-repellency effects are achieved on the substrates, especially textiles, finished with these aqueous preparations.

Baths which in addition to the aqueous preparations also further contain aminoplast pre-condensates and their curing catalysts, are distinguished by good stability.

Unless otherwise stated, the parts denote parts by weight and the percentages denote percentages by weight in the examples which follow.

EXAMPLE 1

370 g. of zinc octoate

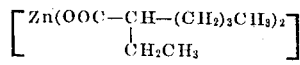

30 g. of a solution of calcium dodecylbenzenesulphonate (70 percent strength solution in isobutanol), 20 g of a condensation product of 1 mol of tributylphenol with 30 mols of ethylene oxide (previously fused at 60° C.) and 280 g of toluene are mixed with one another at room temperature with good stirring. A clear solution is produced.

1000 ml of a liquor are prepared from 75 g of an aqueous polysiloxane emulsion containing 38 percent of linear methyl-hydrogen-polysiloxane end-blocked by methyl groups and 6 g of the solution of zinc octoate described above, as well as the requisite amount of water. A mixed woven fabric of cotton and polyester fibers is twice impregnated with this liquor on a padder using a squeezing-out effect of 50 percent and is then dried at 80° C. for 30 minutes. Thereafter the woven fabric is exposed to a temperature of 100° C. for 4½ minutes. The woven fabric treated in this way is water-repellent and retains this property even after repeated washing.

EXAMPLE 2

The table which follows describes catalyst solutions which contain various non-ionic emulsifiers.

70 g of catalyst preparation contain 35.2 of zinc octoate according to Example 1, 26.3 g of toluene, 3.5 g of water, 3.0 g of calcium salt according to Example 1 and 2 g of a non-ionic emulsifier obtained by addition of 2.1    20 mols of ethylene oxide to 1 mol of hydroabietyl alcohol,
2.2    25 mols of ethylene oxide to 1 mol of hydroabietyl alcohol,
2.3.   30 mols of ethylene oxide to 1 of hydroabietyl alcohol,
2.4.   30 mols of ethylene oxide to 1 mol of stearyl alcohol-palmityl alcohol mixture (1:1),
2.5.   30 mols of ethylene oxide to 1 mol of nonylphenol,
2.6.   35 mols of ethylene oxide to 1 mol of nonylphenol
2.7.   30 mols of ethylene oxide to 1 mol of 2,4,6-tritertiary-butylphenol,
2.8.   35 mols of ethylene oxide to 1 mol of 2,4,6-tri-tertiary-butylphenol,
2.9.   25 mols of ethylene oxide to 1 mol of stearic acid ethanolamide,
2.10   25 mols of ethylene oxide to 1 mol of oleic acid ethanolamide,
2.11   40 mols of ethylene oxide to 1 mol of oleic acid,
2.12.  20 mols of ethylene oxide to 1 mol of hydroabietylamine,
2.13.  40 mols of ethylene oxide to 1 mol of hydroabietylamine,
2.14.  30 mols of ethylene oxide to 1 mol of octadecylamine,
2.15.  40 mols of ethylene oxide to 1 mol of octadecylamine,
2.16.  30 mols of ethylene oxide to 1 mol of fish oil amine [1]( 1. Fish oil amine: 30 percent of palmitylamine, 40 percent of stearylamine, 20 percent of arachylamine and 10 percent of behenylamine.),
2.17.  70 mols of ethylene oxide to 1 mol of fish oil amine [1]) (1. Fish oil amine: 30 percent of palmitylamine, 40 percent of stearylamine, 20 percent of arachylamine and 10 percent of behenylamine.)
2.18.  30 mols of ethylene oxide to 1 mol of a technical amine containing 90 percent of arachylamine and behenylamine.

All these mixtures are clear solutions which self-emulsify on pouring into water and which give good water-repellency figures when used in accordance with Example 1.

EXAMPLE 3

The table which follows describes catalyst solutions which contain the emulsifiers in other ratios than those mentioned in Example 2. 70 g of catalyst preparation contain 35.2 g of zinc octoate according to Example 1, 26.3 g of toluene, 3.5 g of water and $y$ g of the calcium salt of dodecylbenzenesulphonic acid according to Example 1 and $x$ g of non-ionic emulsifier.

3.1.   3.5 g of calcium salt, 1.5 g of the addition product of 35 mols of ethylene oxide to 2,4,6-tri-tert.butylphenol,
3.2.  2.75 g of calcium salt,
2.25 g of the addition product of 35 mols of ethylene oxide to 2,4,6-tri-tert.butylphenol,
3.3.  3.5 g of calcium salt,
1.5 g of the addition product of 30 mols of ethylene oxide to a mixture of stearyl alcohol and palmityl alcohol, 1:1,
3.4.  3.5 g of calcium salt,
1.5 g of the addition product of 30 mols of ethylene oxide to nonylphenol,
3.5.  2.5 g of calcium salt,
2.5 g of the addition product of 30 mols of ethylene oxide to nonylphenol.

All these mixtures are clear solutions which self-emulsify on being poured into water and which when used in accordance with Example 1 give good water-repellency effects.

EXAMPLE 4

The table which follows describes catalyst solutions which contain various non-ionic emulsifiers mixed with sodium dodecylbenzenesulphonate as a 70 percent strength solution in isobutanol.

70 g of catalyst solution contain 35.2 g. of zinc octoate, 26.3 g of toluene, 3.5 g of water, 3.0 g of 70 percent strength sodium salt solution and 2 g of a non-ionic emulsifier which is an addition product of 4.1.  20 mols of ethylene oxide to 1 mol of hydroabietyl alcohol,
4.2.  25 mols of ethylene oxide to 1 mol of hydroabietyl alcohol,
4.3.  30 mols of ethylene oxide to 1 mol of stearyl alcohol-palmityl alcohol (1:1),
4.4.  30 mols of ethylene oxide to 1 mol of nonylphenol,
4.5.  35 mols of ethylene oxide to 1 mol of 2,4,6-tri-tert. butylphenol,
4.6.  40 mols of ethylene oxide to 1 mol of oleic acid,
4.7.  40 mols of ethylene oxide to 1 mol of hydroabietylamine or
4.8.  30 mols of ethylene oxide to 1 mol of fish oil amine (see Example 2).

All these mixtures are clear solutions which self-emulsify on being poured into water and which yield good water-repellency effects when used in accordance with Example 1.

EXAMPLE 5

The table which follows describes catalyst solutions which contain various alkylbenzenesulphonic acid salts. 70 g of catalyst solution contain 35.2 g of zinc octoate, 26.3 g of toluene, 3.5 g of water, 2 g of an addition product of 35 mols of ethylene oxide to 1 mol of 2,4,6-tri-tert.butylphenol and 3.0 g of 70 percent strength sulphonate solution in isobutanol.

5.1.  Potassium dodecylbenzenesulphonate,
5.2.  magnesium dodecylbenzenesulphonate,
5.3.  strontium dodecylbenzenesulphonate,
5.4.  barium dodecylbenzenesulphonate,
5.5.  zinc dodecylbenzenesulphonate,
5.6.  cadmium dodecylbenzenesulphonate,
5.7.  aluminum dodecylbenzenesulphonate,
5.8.  titanyl dodecylbenzenesulphonate,
5.9.  zirconyl dodecylbenzenesulphonate,
5.10. tin dodecylbenzenesulphonate,
5.11. sodium undecylbenzenesulphonate,
5.12. sodium tridecylbenzenesulphonate.

All these mixtures are clear solutions which self-emulsify on being poured into water and which yield good water-repellency effects when used in accordance with Example 1.

EXAMPLE 6

In 70 g of catalyst solution, containing 35.2 g of zinc octoate, 26.3 g of toluene, 3.5 g of water, 3.0 g of calcium salt according to Example 1 and 2.0 g of an addition product of 35 mols of ethylene oxide to 1 mol of 2,4,6-tri-tertiary butylphenol, the toluene is replaced by an equal amount of xylene, ethylbenzene, benzene, 4-isopropyltoluene or tetraline, whereby clear solutions are in each case produced, which behave self-emulsifying on being poured into water and yield colloidal emulsions. Good water-repellency effects are achieved with these catalyst solutions when used in accordance with Example 1.

EXAMPLE 7

8 g of the catalyst solution containing toluene are distributed in 992 g of water in accordance with Example 6. An emulsion is produced of which the number and size of the particles is investigated with the Coulter Counter[1] (1. registered tradename of Coulter Electronics Ltd., St. Albans, England.) a) instrument.

Particle diameter: 50% under $4\mu$ under $1.2\mu$   96%   4 to 8    2.4%   $8\mu$ and above   1.6%

This investigation shows that very fine emulsions are obtained with the emulsion mentioned in Example 7.

EXAMPLE 8

Catalyst solutions of the following composition are manufactured: every 70 g of catalyst solution contain 3.0 g of a 70 percent strength solution of calcium branched-chain dodecylbenzenesulphonate and 2.0 g of an addition product of 35 mols of ethylene oxide to 1 mol of 2,4,6-tri-tertiary butylphenol, the metal salts quoted in the table below as the catalyst, and the specified amount of toluene as the solvent.

| No. | Metal Salt Name | Amount in g | g Toluene |
|---|---|---|---|
| 8.1 | Zirconium di-2-ethylhexoate | 32.4 | 32.6 |
| 8.2 | Cadmium di-2-ethylhexoate | 37.4 | 27.6 |
| 8.3 | Titanium diacetate-dioctoate | 41.5 | 23.5 |
| 8.4 | Titanium dibutyl-dioctoate | 27.5 | 37.6 |
| 8.5 | Zinc dioctoate | 31.6 | 29.7 |
|     | Tin-II dichloride dihydrate | 3.7 | |
| 8.6 | Tin dibutyl dilaurate | 33.1 | 31.9 |
| 8.7 | Tin dibutyl diacetate | 39.2 | 25.8 |
| 8.8 | Tin dioctoate | 24.7 | 40.3 |

These catalyst solutions 8.1 to 8.8 are used in the impregnating baths A to I according to Example 1, with the 6 g of zinc octoate solution being replaced by:

| | |
|---|---|
| A 7.2 g of a catalyst solution in toluene according to example 6 | 0.81 g of tin salt solution 8.6 |
| B 7.2 g of a catalyst solution in toluene according to example 6 | 0.38 g of tin salt solution 8.7 |
| C 7.2 g of a catalyst solution in toluene according to example 6 | 0.70 g of tin salt solution 8.8 |
| D 7.2 g of a catalyst solution in toluene according example 6 | 0.92 g of titanium salt solution 8.4 |
| E 7.0 g of the catalyst solution 8.1 | |
| F 5.0 g of the catalyst solution 8.2 | |
| G 11.85 g of the catalyst solution 8.3 | |
| H 17.8 g of the catalyst solution 8.4 | |
| I 6.67 g of the catalyst solution 8.5 | |

The polyester/cotton mixed woven fabrics finished with these impregnating baths in the same manner as in Example 1 show a good water-repellent effect which remains preserved even after dry cleaning with perchloroethylene.

EXAMPLE 9

Analogously to Example 1, pure woven fabric samples of polyamide, polyester, polyacrylonitrile, wool, regenerated cellulose fibers and cotton are finished with a 38 percent strength silicone emulsion, with the aqueous preparation according to example 1 being used, containing 30 g of silicone emulsion and 12 g of catalyst solution per liter.

| Woven fabric | Poly-amide | Poly-ester | Poly-acrylo-nitrile | Wool | Regen-erated cellulose | Cotton |
| --- | --- | --- | --- | --- | --- | --- |
| Spray test, percent water absorption: | | | | | | |
| Unwashed | 2 | 2.3 | 5.4 | 2.4 | 8 | 7 |
| Dry cleaned | 4 | 3 | 7 | 6 | 9 | 9 |
| Water absorption: Spray test[1]: g of water | 1.57 | 0.13 | 0.24 | 1.43 | 0.65 | 0.31 |

[1] Examples with 100 ml of water.

It can be seen from this table that good water repellency effects are obtained on all textile materials.

SPRAY TEST 25 cm long weighed woven fabric samples are held at both ends by two clips weighing 95 g and laid over two rods. Thereafter the woven fabric samples are sprinkled with 500 ml of water and freed of adhering drops, and the woven sample is weighed. The weight increase, as a measure of the water repellency effect, is specified in percent of the dry weight of the woven fabric.

EXAMPLE 10

Impregnating baths are manufactured analogously to example 9 but these additionally contain 240 g of a 45 percent strength creaseproofing agent, dimethylol-4,5-dihydroxy-imidazolidone-2, and aluminum trichloride hexahydrate as a curing catalyst for the latter.

| | |
| --- | --- |
| 38 % strength silicone emulsion according to example 1 | 60 g/l |
| Catalyst solution according to example 1 | 12 g/l |
| Dimethylol-4,5-dihydroxyimidazolidone-2 | 240 g/l |
| AlCl$_3$·6H$_2$O | 5 g/l |
| Bath stability: | |
| after 1 hour | perfect |
| after 2 hours | perfect |
| after 6 hours | perfect |
| Polyester-cotton-mixed woven fabric finished analogously to example 1 yields | good water repellency and freedom from creasing. |

EXAMPLE 11

Pieces of parchment and of wrapping paper, of size 10 cm², are treated for 10 minutes by the dipping process with impregnating baths in accordance with the table below, and subsequently dried.

| | | Parchment paper | | | Wrapping paper | | |
| --- | --- | --- | --- | --- | --- | --- | --- |
| Silicone emulsion according to example 1 | g/l | 0 | 50 | 100 | 0 | 50 | 100 |
| Catalyst solution according to example 1 | g/l | 0 | 5 | 10 | 0 | 5 | 10 |
| a pentamethylol-melamine dimethyl ether resin solution of 60 % strength | g/l | 0 | 50 | 100 | 0 | 50 | 100 |

What is claimed is:

1. A clear, stable catalyst solution for curing polysiloxanes consisting essentially of
    a. a zinc, cadmium, titanium or zirconium salt of a carboxylic acid containing six to 22 carbon atoms,
    b. an alkylbenzenesulfonic acid salt of a metal with an atomic weight of at most 138 which is selected from the first main group, second main group, second sub-group, third main group, fourth main group and fourth sub-group of the periodic system, and with the alkyl radical or radicals in total containing not less than eight carbon atoms,
    c. a water-soluble polyethylene glycol compound which per molecule contains 18 to 80 —CH$_2$CH$_2$—O— groups and at least one hydrophobic radical of an organic compound which has been produced by splitting off a hydrogen atom, from a member selected from the group consisting of a hydroxyl, mercapto, carboxyl, carboxyamido or amino group of an organic compound, in
    d. an aromatic hydrocarbon of the benzene series, which is unsubstituted or alkylated with one to four alkyl carbon atoms and having a molecular weight of at most 134 and having a boiling point of at most 165° C. wherein said solution contains relative to to the weight of the solution 13 to 67 percent of component a, 1 to 15 percent of components b and c together, and 18 to 84 percent of component d, with the weight ratio of b:c being 2:1 to 2:3.

2. A solution according to claim 1 wherein component
    a. is the zinc or zirconium salt of said carboxylic acid, and
    d. is an aromatic hydrocarbon having a boiling point of at most 165° C.

3. A solution according to claim 1 wherein component
    a. is a zinc or zirconium salt of a fatty acid with six to 22 carbon atoms.

4. A solution according to claim 1, wherein component b is an alkylbenzenesulfonic acid salt having eight to 18 carbon atoms in the alkyl radical of a metal of the second main group of the periodic system.

5. A solution according to claim 1, wherein component
    b. is the calcium salt of a dodecylbenzenesulfonic acid.

6. A solution according to claim 1, wherein component c is a water-soluble polyethylene glycol compound which contains per molecule 30 to 50 — CH$_2$CH$_2$—O— groups and at least one phenoxy or alkylphenoxy radical.

7. A solution according to claim 1, wherein component c is a water-soluble polyethylene glycol compound which per molecule contains 30 —CH$_2$CH$_2$—O— groups and a tributylphenoxy radical.

8. A solution according to claim 1, wherein component d is toluene, xylene or 1,2,3,4-tetrahydronaphthalene.

* * * * *

PO-1050
(5/69)

UNITED STATES PATENT OFFICE
CERTIFICATE OF CORRECTION

Patent No. 3,668,228          Dated June 6, 1972

Inventor(s) HANS RUDOLF ZBINDEN

It is certified that error appears in the above-identified patent and that said Letters Patent are hereby corrected as shown below:

Column 1, after "Assignee:" delete "Ciba Limited" and substitute --- CIBA-GEIGY AG ---.

Signed and sealed this 16th day of April 1974.

(SEAL)
Attest:

EDWARD M.FLETCHER,JR.          C. MARSHALL DANN
Attesting Officer                 Commissioner of Patents aaa